United States Patent [19]

Sakamoto et al.

[11] Patent Number: 4,601,889
[45] Date of Patent: Jul. 22, 1986

[54] PROCESS FOR THE RECOVERY OF HEAVY METAL

[75] Inventors: Nagayoshi Sakamoto; Junichi Kugimoto, both of Ichihara, Japan

[73] Assignee: UBE Industries, Ltd., Ube, Japan

[21] Appl. No.: 546,987

[22] Filed: Oct. 31, 1983

[30] Foreign Application Priority Data

Nov. 2, 1982 [JP] Japan .................... 57-191759

[51] Int. Cl.$^4$ .............................. C01G 56/00
[52] U.S. Cl. ............................. 423/7; 423/24; 423/49; 423/54; 423/63; 423/70; 423/89; 423/139; 560/169; 525/328.2
[58] Field of Search ............ 423/7, 24, 49, 54, 63, 423/70, 89, 139; 560/169; 525/328.2

[56] References Cited

FOREIGN PATENT DOCUMENTS 0020132  2/1981  Japan .

OTHER PUBLICATIONS 1,5-Cycloaddition, Reactivity of glyoxylic acid phenylacetylhydrazones, Chemical Abstract vol. 70, 115041b.

Primary Examiner—Paul Lieberman
Assistant Examiner—Hoa van Le
Attorney, Agent, or Firm—Frishauf, Holtz, Goodman & Woodward

[57] ABSTRACT

A process for the recovery of a heavy metal which comprises:

bringing a polymer having pendant groups of the formula:

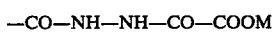

—CO—NH—NH—CO—COOM in which M is hydrogen, sodium or potassium, into contact with an aqueous solution containing a heavy metal to have the heavy metal adsorbed by said polymer;

and having said heavy metal desorbed from the said polymer.

7 Claims, No Drawings

PROCESS FOR THE RECOVERY OF HEAVY METAL

BACKGROUND OF THE INVENTION

1. FIELD OF THE INVENTION

This invention relates to a process for the recovery of a heavy metal from an aqueous solution containing the heavy metal.

The recovery of heavy metals from various aqueous solution containing a small amount of the heavy metals such as seawater, water of river, lake, or swamp, or waste water drained from industrial processing apparatus is advantageous not only for removing unfavorable heavy metals but also for collecting valuable heavy metals.

Particularly, seawater contains approx. 3 $\mu g/l$. of uranium dissolved therein. Since uranium is of great value as fuel for nuclear reactor, a process for efficiently recovering uranium from seawater which contains totally a great amount of uranium is earnestly desired.

2. DESCRIPTION OF PRIOR ARTS

There have been known arts for recovering uranium from seawater or the like containing a small amount of uranium which employ various adsorbents. Examples of the adsorbents include inorganic adsorbents such as titanic acid, gelana, and active carbon-titanic acid adsorbents, and organic adsorbents such as resinous adsorbents, for instance, resorcinol-arsonic acid-formaldehyde resin, and amidoxime-containing resin. Among these adsorbents, the organic adsorbents are considered to be preferably employable in industry because the organic adsorbents are easily moldable and readily handled. Nevertheless, known adsorbents for the recovery of uranium have certain drawbacks such as poor adsorbing efficiency, poor strength for the employment as the practically usable adsorbents. Accordingly, improvements in the adsorbents have been desired.

At present, it is known that a polymer containing acid hydrazide groups can adsorb heavy metals such as mercury, copper, nickel, silver, zinc, cobalt, and the like contained in an aqueous solution. However, this acid hydrazide group-containing polymer shows very poor adsorbing efficiency for uranium dissolved in an aqueous solution such as seawater. Thus, this polymer is not advantageous in practical use as the absorbent for uranium. Further, the use of a polymer prepared by reaction of the acid hydrazide group-containing polymer with pyridinealdehyde is proposed. However, the adsorbing efficiency of this polymer is still too low to employ as the adsorbent in industry.

SUMMARY OF THE INVENTION

Accordingly, a primary object of the present invention is to provide a process for efficiently recovering heavy metals from aqueous solutions containing a small amount of the heavy metals such as uranium contained in seawater.

There is provided by the invention a process for the recovery of a heavy metal which comprises bringing a polymer having groups of the formula (I):

in which M is hydrogen, sodium or potassium, into contact with an aqueous solution containing a heavy metal to have the heavy metal adsorbed by said polymer;

and having said heavy metal desorbed from the said polymer.

PREFERRED EMBODIMENTS OF THE INVENTION

The adsorbent employed in the present invention can be prepared, for instance, by reaction of a polymer having an acid hydrazide group ($-CONHNH_2$) with an acid chloride, or by additional hydrolysis.

The acid hydrazide group-containing polymer can be generally prepared by reacting a polymer having a carboxlic acid ester group with hydrazine.

Examples of the carboxylic acid ester group-containing polymer include homopolymers and copolymers of unsaturated acid ester monomers such as methyl acrylate and methyl methacrylate; and esterification products of natural polymers such as alginic acid and pectic acid. Examples of comonomers employable for the preparation of the copolymer of the unsaturated acid ester monomers include divinylbenzene, vinyl acetate, styrene, vinylpirrolidone, N-vinylacetamide, acrylonitrile, acrylic acid, acrylamide, vinyl chloride, vinylidene chloride, methacrylonitrile, methyl vinyl ketone, vinylpyridine, maleic anhydride, diethyl maleate, fumaronitrile, diethyl fumalate, methyl triethyleneglycol dimethacrylate, divinylethylene glycol, ethylene, propylene, butylene, butadiene, and isoprene. The above-mentioned examples are not given to limit the employable comonomers, and any monomer copolymerizable with the unsaturated acid esters can be employed for the purpose. The comonomer can be employed singly or in combination.

There is no specific limitation on the content of the caroxylic acid unit in the carboxylic acid ester group-containing polymer, but the content of the unit is generally not less than 20 mole %, preferably not less than 50%. If the carboxylic acid ester group-containing polymer is an esterification product of a natural polymer, a vinyl compound is preferably grafted to the esterification product to make it water-insoluble.

The carboxylic acid ester group-containing polymer is then caused to react with hydrazine in the original form of the polymerization product, otherwise, in modified forms such as fibrous, stick, network, felt, and so forth.

The reaction between the carboxylic acid ester group-containing polymer and hydrazine can be carried out at a temperature ranging from 50° to 200° C. to obtain an acid hydrizide group-containing polymer. The hydrazine may be a anhydrous or hydrated one, but hydrated hydrazine is preferred.

Otherwise, the acid hydrizide group-containing polymer can be prepared by reaction of a polymer having an acid chloride group ($-COCl$) with hydrazine.

The acid hydrizide group-containing polymer is then caused to react with an acid chloride to obtain the polymer having groups of formula (I) employable as the adsorbent in the present invention. Representative examples of the acid chloride employable in the above-mentioned reaction include:

(1) an acid chloride having the formula (II):

(II)

in which R is chlorine, hydrogen or an alkoxy group containing 1–5 carbon atoms, and n is 0 or 1, provided that R is chlorine or an alkoxy group containing 1–5 carbon atoms in the case of n=0;
(2) acetoxyacetic acid chloride; and
(3) acetoxysuccinic acid dichloride.

Examples of the acid chloride having the formula (II) include: oxalic acid chlorides such as oxalic acid dichloride, monomethyl oxalate monochloride, monoethyl oxalate monochloride, monopropyl oxalate monochloride, monobutyl oxalate monochloride, and monopentyl oxalate monochloride; and malonic acid chlorides such as malonic acid monochloride, monomethyl malonate monochloride, monoethyl malonate monochloride, monopropyl malonate monochloride, monobutyl malonate monochloride, and monopentyl malonate monochloride.

The reaction between the acid hydrazide group-containing polymer and the acid chloride can be carried out in the presence or absence of a solvent, but is preferably performed in a solvent. Examples of the solvent employable in the invention include: aromatic hydrocarbon such as benzene, toluene and xylene; halogenated hydrocarbons such as carbon tetrachloride and chloroform; ethers such as dioxane; and nitrogen-containing organic solvents such as dimethylformamide, dimethylacetamide, N-methylpyrrolidone and pyridine. The reaction proceeds gradually even at a low temperature, but is preferably carried out at a temperature ranging from 50° to 150° C.

The reaction product is then taken out of the reaction mixture, washed with the same solvent as the employed one, methanol and/or water to remove an unreacted starting materials attached to the product, and dried under reduced pressure to obtain the desired polymer. The obtained polymer may be further hydrolyzed in an aqueous alkaline or acidic solution and dried to give a hydroloyzed polymer. Particularly, a polymer prepared by the use of an acid chloride of the formula (II) in which R is an alkoxy group is preferably hydrolyzed for the use as the adsorbent.

The polymer having groups of the formula (I) can be alternatively prepared by homopolymerization of a vinyl monomer having the formula (III);

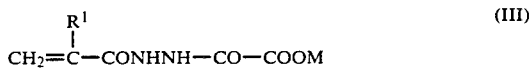

in which $R^1$ is hydrogen or methyl, and M has the same meaning as defined above,
or copolymerization of said vinyl monomer and one or more other monomers.

Examples of the vinyl monomer having the formula (III) include 1-methacryloyl-2-oxalohydrazine, potassium 2-methacryloylhydrazinoxalate, potassium 2-methacryloylhydrazinoxalate, 1-acryloyl-2-oxalohydrazine, sodium 2-acryloylhyrazinoxalate, and potassium 2-acryloylhydrazinoxalate. The vinyl monmer having the formula (III) can be prepared by reaction of acrylic acid chloride or methacrylic acid chloride with a compound having the formula (IV):

in which M has the same meaning as defined above.

The polymer having groups of the formula (I) can be otherwise prepared by hydrolysis of a homopolymer of a vinyl monomer having the formula (V):

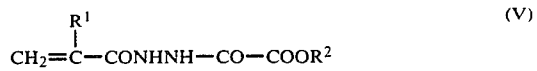

in which $R^1$ is hydrogen or methyl, and $R^2$ is an alkyl group containing 1–18 carbon atoms,
or hydrolysis of a copolymer of said vinyl monomer and one or more other monomers.

Examples of the vinyl monomer having the formula (V) include 1-methacryloyl-2-methoxalylhydrazine, 1-methacryloyl-2-ethoxalylhydrazine, 1-methacryloyl-2-propoxalylhydrazine, 1-methacryloyl-2-butoxalylhydrazine, 1-methacryloyl-2-pentoxalylhydrazine 1-methacryloyl-2-hexoxalylhydrazine, 1-methacryloyl-2-heptoxalylhydrazine, 1-methacryloyl-2-octoxalylhydrazine, 1-methacrylo-yl-2-nonoxalylhydrazine, 1-methacryloyl-2-decoxalylhydrazine, 1-methacryloyl-2-undecoxalylhydrazine, 1-methacryloyl-2-dodecoxalylhydrazine, 1-methacryloyl-2-tridecoxalylhydrazine, 1-methacryloyl-2-tetradecoxalylhydrazine, 1-methacryloyl-2-pentadecoxalylhydrazine, 1-methacryloyl-2-hexadecoxalylhydrazine, 1-methacryloyl-2-heptadecoxalylhydrazine, 1-methacryloyl-2-octadecoxalylhydrazine, 1-acryloyl-2-methoxalylhydrazine, 1-acryloyl-2-ethoxalylhydrazine, 1-acryloyl-2-propoxalylhydrazine, 1-acryloyl-2-butoxalylhydrazine, 1-acryloyl-2-pentoxalylhydrazine, 1-acryloyl-2-hexoxalylhydrazine, 1-acryloyl-2-heptoxalylhydrazine, 1-acryloyl-2-octoxalylhydrazine, 1-acryloyl-2-nonaxalylhydrazine, 1-acryloyl-2-decoxalylhydrazine, 1-acryloyl-2-undecoxalylhydrazine, 1-acryloyl-2-dodecoxalylhydrazine, 1-acryloyl-2-tridecoxalylhydrazine, 1-acryloyl-2-tetradecoxalylhydrazine, 1-acryloyl-2-pentadecoxalylhydrazine, 1-acryloyl-2-hexadecoxalylhydrazine, 1-acryloyl-2-heptadecoxalylhydrazine, and 1-acryloyl-2-octadecoxalylhydrazine.

The polymer having groups of the formula (I) can be otherwise prepared by reaction of a compound having the aforementioned formula (IV) and a polymer containing acid chloride groups, acid anhydride groups, or acid amide groups.

The polymer containing acid chloride groups can be prepared by reacting a carboxyl group-containing polymer with phosgene, phosphorous pentachloride, or thionyl chloride, or by homopolymerization or copolymerization of a vinyl compound having an acid chloride group. Examples of the carboxyl group-containing polymer include homopolymers and copolymers of methacrylic acid, acrylic acid, or p-vinylbenzoic acid, and hydrolyzed products of homopolymers and copolymers of vinyl compounds containing a carboxylic acid ester group such as methyl methacrylate, methyl acrylate, and methyl p-vinylbenzoate.

Examples of the acid chloride group-containing vinyl compounds include acrylic acid chloride and methacrylic acid chloride.

The polymer containing acid anhydride groups can be a copolymer of maleic anhydride with a comonomer, or can be prepared by reacting thionyl chloride with a homopolymer of copolymer of a carboxyl group-containing vinyl compound such as acrylic acid or methacrylic acid.

The polymer containing acid amide groups can be prepared by homopolymerization or copolymerization of a vinyl compound having an acid amide group such as acrylamide or methacrylamide, or by dehydration under heating at 120°–230° C. of an ammonium salt of a carboxylic acid group-containing polymer prepared by reaction of the carboxylic acid group-containing polymer with ammonia.

The reaction of a compound having the aforementioned formula (IV) and a polymer containing acid chloride groups, acid anhydride groups, or acid amide groups can be carried out in a solvent. Examples of the solvent employable in the reaction include N-methyl-2-pyrrolidone, dimethylformamide, dimethylacetamide, benzene, toluene, xylene and dioxane. In the case of the reaction of the acid chloride group containing polymer, the reaction is generally carried out at a temperature in the range of −10°–150° C., preferably 10°–80° C. In the case of the reaction of the acid anhydride group-containing polymer, the reaction is generally carried out at a temperature in the range of 20°–150° C. In the case of the reaction of the acid amide group-containing polymer, the reaction is generally carried out at a temperature in the range of 100°–250° C., preferably 150°–220° C.

If the acid chloride groups contained in the polymer are positioned adjacent to each other, an imide group may be formed on the polymer in the course of the reaction with a compound of the formula (IV). The formation of the imide group may take place in the reaction between the acid anhydride group-containing polymer and a compound of the formula (IV). The polymer containing thus produced imide groups can be treated with water or an aqueous alkaline solution to obtain a polymer having groups of the formula (I).

Alternatively, a polymer having groups of the formula (I) can be prepared by other processes. Example of other processes include hydrolysis of a polymer prepared by reaction of an acid hydrazide group (—CONHNH$_2$)-containing polymer with an oxalic acid ester, in an aqeous alkaline solution.

In the above-mentioned copolymerization or copolymer, examples of the employable comonomer include divinylbenzene, vinyl acetate, styrene, vinylpyrrolidone, N-vinylacetamide, acrylonitrile, acrylic acid, acrylamide vinyl chloride, vinylidene chloride, methacrylonitrile, methyl vinyl ketone, vinylpyridine, maleic anhydride, diethyl maleate, fumaronitrile, diethyl fumalate, methyl triethyleneglycol dimethacrylate, divinylethylene glycol, ethylene, propylene, butyrene, butadiene, and isoprene. The above-mentioned examples are not to given to limit the employable comonomers. The comonomer can be employed singly or in combination.

The polymer having groups of the formula (I) can be employed in the form of a polymerization product per se as the adsorbent for the recovery of heavy metals. Otherwise, the polymerization product can be modified to convert to any other forms described hereinbefore or other. The present polymer is preferably employed as the adsorbent in the form of one having macroreticular structure.

The process for the recovery of a heavy metal of the present invention comprises a stage for adsorbing a heavy metal by the adsorbent (adsorbing stage) and a subseqent stage for desorbing the adsorbed heavy metal from the adsorbent (desorbing stage).

The adsorbing stage can be carried out by bringing the adsorbent into contact with an aqueous solution containing a heavy metal. Examples of the heavy metal to be adsorbed include uranium, iron, zinc, nickel, cobalt, lead, mercury, silver, and gold. Since the adsorbent of the present invention can selectively adsorb uranium, this adsorbent is preferably employable for collecting or removing uranium.

The adsorbing stage can be carried out at an optional temperature, but the stage is generally performed at room temperature. The adsorbing stage can be done by causing an aqueous solution containing a heavy metal to pass through a column of the adsorbent, or keeping the adsorbent under stirring for a certain period in an aqueous solution containing a heavy metal.

The heavy metal adsorbed by the adsorbent in the adsorbing stage is recovered in the subsequent desorbing stage. The desorbing stage can be carried out by bringing the adsorbent carrying the heavy metal into contact with an eluent. Examples of the eluent include an aqueous solution containing an inorganic salt such as ammonium carbonate, sodium carbonate or sodium hydrogen carbonate, and a diluted mineral acid such as diluted hydrochloric acid or diluted sulfuric acid.

The desorbing stage can be carried out by causing an eluent to pass through a column of the adsorbent carrying the heavy metal adsorbed thereby, or keeping the adsorbent carrying the heavy metal under stirring for a certain period in an eluent.

The process for the recovery of heavy metals, particularly uranium, according to the present invention can be carried out in the manner as described above, and the efficiency of the recovery is prominently high. Moreover, since the polymer employed in the invention is highly resistant to deterioration caused by the contact with an aqueous solution of heavy metals and an eluent, the polymer can be repeatedly employed as the adsorbent for a long period. Accordingly, the polymer of the invention is of value as the adsorbent employable in the industrial use.

The present invention is further illustrated by the following examples.

EXAMPLE 1

(1) Preparation of Adsorbent

A solution consisting of 67.2 g. of methyl methacrylate purified by vacuum distillation, 3.4 g. of divinylbenzene (purity: 55%) washed with aqueous sodium hydroxide solution, and 37.5 ml. of isooctane was dispersed in an aqueous solution consisting of 0.6 g. of gelatin, 4.0 g. of sodium sulfate, 4.7 g. of calcium carbonate, and 500 ml. of water. Further, 0.75 g. of benzoyl peroxide (catalyst) was added. The resulting mixture was heated from room temperature to 70° C. over one hour, and the suspension polymerization was performed at 70° C. for 5 hours. The polymerization product was collected by filtration, and the unreacted methyl methacrylate was removed by successive washing with methanol and water. The product was then treated with hydrochloric acid to decompose calcium carbonate, washed with hot water to remove other agents, and dried to give a resin having macroreticular structure.

30 g. of the resin having macroreticular structure and 150 ml. of 90 % hydrazine were heated at 175° C. for 6.5 hours in an autoclave. The treated resin was collected by filtration, washed successively with diluted hydrochloric acid and water, and dried. The elementary analysis indicated that the resulting resin consisted of 25.4% of methyl methacrylate unit, 70.9% of hydrazide methacrylate unit, and 3.7% of divinylbenzene unit. This resin was named Resin A.

To 1 g. of Resin A was added 10 ml. of oxalic acid dichloride, and the resulting mixture was stirred at 65° C. for 6 hours to perform a reaction. The treated resin was washed with water and dried to give a resin having 2-oxalohydrazinocarbonyl groups (Adsorbent I).

(II) Adsorption Test

Seawater was collected and filtered to remove insoluble materials such as suspended dusts. The treated seawater contained 3.08 μ/1 of uranium, according to a method for quantitative determination described in Analytical Chemistry (Japan) 26, 74(1977). This seawater was employed as a uranium-containing sample in all of the following examples.

In 5 l.-Erlenmeyer flask were placed 5 l. of the sample and 100 mg. of Adsorbent I, and the flask was stoppered. The mixture was electromagnetically stirred continuously for 7 days. After the stirring was terminated, the adsorbent was collected by filtration and kept in 10 ml. of 5 N hydrochloric acid for one day to desorb the adsorbed uranium. Thus desorbed uranium was analyzed in the above-mentioned manner to indicate that the amount of uranium adsorbed by Adsorbent I was 8.40 μg. (adsorbed ratio: 54.5 %).

EXAMPLE 2

To 2 g. of Resin A (same as prepared in Example 1) were added 50 ml. of benzene and 5 g. of monomethyl oxalate monochloride, and the resulting mixture was refluxed under stirring for 5 hours. The treated resin was washed successively with methanol and water, and dried under reduced pressure. 1 g. of the dry resin was then stirred in 50 ml. of 20% aqueous sodium hydroxide solution at room temperature for 8 hours, washed with water, and dried to give Adsorbent II having 2-oxalohydrazinocarbonyl groups.

Adsorbent II was subjected to the adsorption test in the same manner as in Example 1 to give the following result.

| Adsorbent | Adsorbed Uranium Amount | Adsorbed Ratio |
| --- | --- | --- |
| Adsorbent II | 7.33 μg. | 47.5% |

EXAMPLE 3

To 2 g. of Resin A (same as prepared in Example 1) were added 100 ml. of xylene and 8 g. of monobutyl oxalate monochloride, and the resulting mixture was stirred at 100° C. for 7 hours. The treated resin was washed with methanol, and dried under reduced pressure. 1 g. of the dry resin was then stirred in 50 ml. of diluted hydrochloric acid under reflux for 6 hours, washed with water and methanol, and dried to give Adsorbent III having 2-oxalohydrazinocarbonyl groups.

Adsorbent III was subjected to the adsorption test in the same manner as in Example 1 to give the following result.

| Adsorbent | Adsorbed Uranium Amount | Adsorbed Ratio |
| --- | --- | --- |
| Adsorbent III | 7.04 μg. | 45.7% |

COMPARISON EXAMPLE 1

Resin A (same as prepared in Example 1) was subjected to the adsorption test in the same manner as in Example 1 to give the following result.

| Adsorbent | Adsorbed Uranium Amount | Adsorbed Ratio |
| --- | --- | --- |
| Resin A | 0.90 μg. | 5.8% |

COMPARISON EXAMPLE 2

1 g. of Resin A (same as prepared in Example 1) was stirred in 50 ml. of 20% aqueous sodium hydroxide solution at room temperature for 8 hours, washed with water and dried under reduced pressure to give Resin B.

Resin B was subjected to the adsorption test in the same manner as in Example 1 to give the following result.

| Adsorbent | Adsorbed Uranium Amount | Adsorbed Ratio |
| --- | --- | --- |
| Resin B | 0.83 μg. | 5.3% |

COMPARISON EXAMPLE 3

1 g. of Resin A (same as prepared in Example 1) was refluxed under stirring in 50 ml. of 8 N hydrochloric acid for 6 hours, washed successively with water and methanol, and dried under reduced pressure to give Resin C.

Resin C was subjected to the adsorption test in the same manner as in Example 1 to give the following result.

| Adsorbent | Adsorbed Uranium Amount | Adsorbed Ratio |
| --- | --- | --- |
| Resin C | 0.94 μg. | 6.1% |

COMPARISON EXAMPLE 4

1 g. of Resin A (same as prepared in Example 1) was stirred in 40 ml. of 12.5% aqueous potassium hydroxide solution at 0°-5° C. for 3.5 hours, and collected by filtration. The collected resin was stirred in 20 ml. of 8 N hydrochloric acid at room temperature for 2 hours, washed with water, and dried under reduced pressure to give Resin D.

Resin D was subjected to the adsorption test in the same manner as in Example 1 to give the following result.

| Adsorbent | Adsorbed Uranium Amount | Adsorbed Ratio |
| --- | --- | --- |
| Resin D | 1.03 μg. | 6.6% |

EXAMPLE 4

1.6 g. (7.8 mmol.) of 1-methacryloyl-2-ethoxalylhydrazine and 0.4 g. (1.7 mmol.) of divinylbenzene were copolymerized at 75° C. for 5 hours in 40 ml. of 4-methyl-2-pentanol in the presence of 80 mg. (0.59 mmol.) of azobisisobutylonitrile (AIBN, catalyst) to give 1.30 g. of Resin E.

0.200 g. of Resin E was hydrolyzed by stirring at 40° C. for 3 hours in a solution of 0.40 g. of sodium hydroxide in 10 ml. of water, and then the hydrolyzed resin was collected by fitration. The resin was then washed with water, immersed in 0.2 N hydrochloric acid for 2 hours, washed successively with water and methanol, and dried at approx. 60° C. for one day under reduced pressure to give 0.170 g. of Adsorbent IV having 2-oxalohydraxinocarbonyl groups and AV (acid value)=6.36 meq./g.

The above-described hydrolysis of Resin E was repeated except that the temperature was changed to 50° C., and the hydrolyzed resin was treated in the same manner as above to give 0.165 g. of Adsorbent V having 2-oxalohydrazinocarbonyl groups and AV=6.29 meq./g.

The above-described hydrolysis of Resin E was repeated except that the temperature was changed to 60° C., and the hydrolyzed resin was treated in the same manner as above to give 0.176 g. of Adsorbent VI having 2-oxalohydrazinocarbonyl groups and AV=6.24 meq./g.

The above-described hydrolysis of Resin E. was repeated except that 0.500 g. of Resin E was stirred at 40° C. for 3 hours in a solution of 1.0 g. of sodium hydroxide in 25 ml. of water, and the hydrolyzed resin was treated in the same manner as above to give 0.42 g. of Adsorbent VII having 2-oxalohydraxinocarbonyl groups and AV=6.67 meq./g.

Adsorbents IV through VII were subjected to the adsorption test in the same manner as in Example 1 except that the period of the adsorbing stage was changed to 24 hours and the period of the desorbing stage was changed to 4 hours to give the following results.

| Adsorbent | Adsorbed Uranium Amount | Adsorbed Ratio |
|---|---|---|
| Adsorbent IV | 8.21 μg. | 53.0% |
| Adsorbent V | 8.46 μg. | 54.6% |
| Adsorbent VI | 8.32 μg. | 53.7% |
| Adsorbent VII | 8.15 μg. | 52.6% |

EXAMPLE 5

1.4 g. (6.9 mmol.) of 1-methacryloyl-2-ethoxalylhydrazine and 0.6 g. (2.5mmol.) of divinylbenzene were copolymerized at 75° C. for 5 hours in 40 ml. of 4-methyl-2-pentanol in the presence of 80 mg. (0.59 mmol.) of azobisisobutylonitrile (AIBN, catalyst) under reduced pressure to give 1.30 g. of Resin F.

0.200 g. of Resin F was hydrolyzed by stirring at 40° C. for 3 hours in a solution of 0.40 g. of sodium hydroxide in 10 ml. of water, and then the hydrolyzed resin was collected by fitration. The resin was then washed with water, immersed in 0.2 N hydrochloric acid for 2 hours, washed successively with water and methanol, and dried at approx. 60° C. for one day under reduced pressure to give 0.170 g. of Adsorbent VIII having 2-oxalohydrazinocarbonyl groups and AV=5.34 meq./g.

The above-described hydrolysis of Resin F was repeated except that the temperature was changed to 50° C., and the hydrolyzed resin was treated in the same manner as above to give 0.158 g. of Adsorbent IX having 2-oxalohydrazinocarbonyl groups and AV=5.64 meq./g.

The above-described hydrolysis of Resin F was repeated except that the temperature was changed to 60° C., and the hydrolyzed resin was treated in the same manner as above to give 0.167 g. of Adsorbent X having 2-oxalohydrazinocarbonyl groups and AV=5.51 meq./g.

Adsorbents VIII through X were subjected to the adsorption test in the same manner as in Example 1 except that the period of the adsorbing stage was changed to 24 hours and the period of thd desorbing stage was changed to 4 hours to give the following results.

| Adsorbent | Adsorbed Uranium Amount | Adsorbed Ratio |
|---|---|---|
| Adsorbent VIII | 7.34 μg. | 47.4% |
| Adsorbent IX | 7.95 μg. | 51.3% |
| Adsorbent X | 8.28 μg. | 53.1% |

COMPARISON EXAMPLE 5

Amberite IRC-50 (trade name, produced by Rohm & Haas, methacrylic acid - divinylbenzene copolymer) and Duolite CS-346 (trade name, produced by Diamond Shamrock Corp., amidoxime type adsorbent) were respectively subjected to the adsorption test in the same manner as in Examples 4 and 5 to give the following results.

| Adsorbent | Adsorbed Uranium Amount | Adsorbed Ratio |
|---|---|---|
| Amberite IRC-50 | 0.00 μg. | 0.0% |
| Duolite CS-346 | 2.46 μg. | 15.9% |

We claim:

1. A process for the recovery of a heavy metal which comprises:
bringing a polymer having pendant groups of the formula:

—CO—NH—NH—CO—COOM in which m is hydrogen, sodium or potassium, into contact with an aqueous solution containing a heavy metal to have the heavy metal adsorbed by said polymer;
and
having said heavy metal desorbed from the said polymer.

2. The process for the recovery of a heavy metal claimed in claim 1, in which said polymer is composed of macroreticular structure.

3. The process for the recovery of a heavy metal claimed in claim 1, in which said heavy metal is uranium.

4. The process for the recovery of a heavy metal claimed in claim 1, in which said polymer is a polymer prepared by reaction of a polymer having an acid hydrazide group with an acid chloride, or a hydrolyzed product of said polymer.

5. The process for the recovery of a heavy metal claimed in claim 4, in which the acid chloride is selected from the group consisting of:
(1) an acid chloride having the formula:

Cl—CO—(CH₂)ₙ—CO—R in which R is chlorine, hydrogen or an alkoxy group containing 1-5 carbon atoms, and n is 0 or 1, provided that R is chlorine or an alkoxy group containing 1-5 carbon atoms in the case of n=0;
(2) acetoxyacetic acid chloride; and (3) acetoxysuccinic acid dichloride.

6. The process for the recovery of a heavy metal claimed in claim 1, in which said polymer is a polymer prepared by homopolymerization of a vinyl monomer having the formula:

in which $R^1$ is hydrogen or methyl, and M has the same meaning as defined above, or copolymerization of said vinyl monomer and one or more other monomers.

7. The process for the recovery of a heavy metal claimed in claim 1, in which said polymer is a polymer prepared by hydrolysis of a homopolymer of a vinyl monomer having the formula:

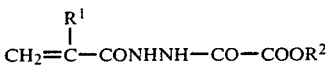

in which $R^1$ is hydrogen or methyl, and $R^2$ is an alkyl group containing 1–18 carbon atoms, or hydrolysis of a copolymer of said vinyl monomer and one or more other monomers.

* * * * *